Oct. 14, 1969     R. S. HUGHES     3,473,134

TEMPERATURE STABLE D.C. INVERTER

Filed April 15, 1966

INVENTOR.
RICHARD S. HUGHES
BY
ROY MILLER
ATTORNEY.

United States Patent Office 3,473,134
Patented Oct. 14, 1969

3,473,134
TEMPERATURE STABLE D.C. INVERTER
Richard Smith Hughes, China Lake, Calif., assignor to the United States of America as represented by the Secretary of the Navy
Filed Apr. 15, 1966, Ser. No. 543,778
Int. Cl. H03f 3/18, 3/68
U.S. Cl. 330—17　　　　　　　　　　　　　　　4 Claims

ABSTRACT OF THE DISCLOSURE

A direct current inverting amplifier using a pair of PNP and NPN transistors coupled so that the output voltage of the amplifier remains constant if the input voltage is not varied regardless of changes in the ambient temperature.

---

The invention described herein may be manufactured and used by or for the Government of the United States of America for governmental purposes without the payment of any royalties thereon or therefor.

The present invention relates to an electronic signal inverting circuit and more particularly, to a temperature stable electronic signal inverting circuit and specifically, to a temperature stable electronic signal inverting circuit having a linear output.

D.C. inverters are commonly used in computer circuitry for providing the inverse of an input signal. However, the design of D.C. inverters can be quite complicated and cumbersome especially when one desires an accurate linear output independent of temperature.

An object of the present invention is to provide a temperature stable D.C. inverter.

Another object of the present invention is to provide a temperature stable D.C. inverter having a minimum of components.

A further object of the present invention is to provide a D.C. inverter having a relatively linear output which utilizes a common base amplifier.

Other objects and advantages of the invention will be understood from the following description when taken in conjunction with the accompanying drawings in which.

Figure 1:
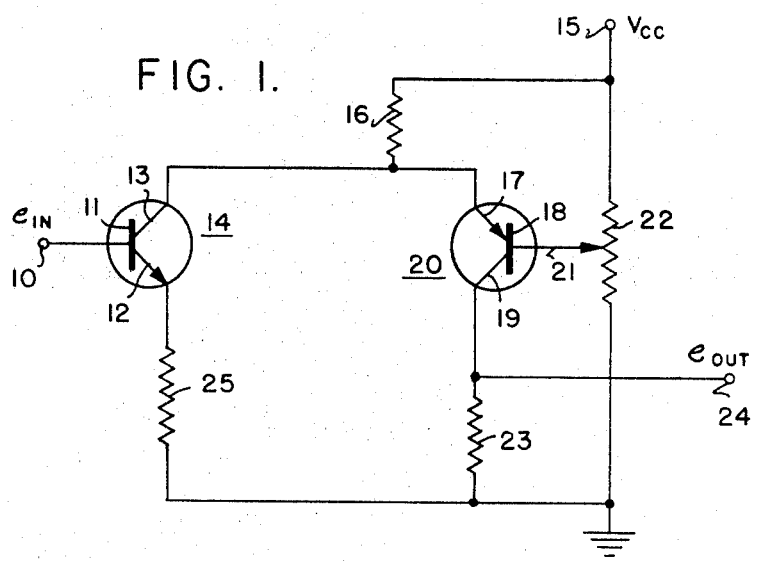
FIG. 1 is a schematic diagram of one embodiment of the present invention.

In the embodiment of FIG. 1 a signal corresponding to $e_{in}$ is coupled from an input terminal 10 to base element 11 of a transistor 14. Transistor 14 also includes a collector element 13 and an emitter element 12 which is connected to ground through resistor 25. The collector element 13 is connected to a D.C. source 15 through resistor 16 and also connected directly to emitter element 17 of transistor 20.

Transistor 20 also has a base element 18 and a collector element 19 which is connected to ground through resistor 23. Collector 19 is also coupled to an output terminal 24 where output voltage equals $e_{out}$ is taken off. Base 18 is coupled to movable arm 21 or a potentiometer 22 which is coupled between the D.C. supply 15 and ground potential.

In the operation of the circuit of FIG. 1, let it be assumed that a one-to-one relationship between input and output is desired. Therefore, $e_{out} + e_{in} =$ Constant $(K)$. In this instance potentiometer 22 is adjusted such that with $e_{in} =$ zero, $e_{out} = K$. Also, let it be assumed that initially transistor 14 is off, $e_{in} =$ zero. Transistor 20 is then on and maximum output (K) is taken across resistor 23. Again, the output is determined by the setting of potentiometer 22.

As the input voltage $e_{in}$ increases, conduction of transistor 14 also increases, the current through collector 13 increases thereby causing a current drop at the emitter 17 of transistor 20, and thus the output voltage developed across resistor 23 correspondingly decreases.

Figure 2:
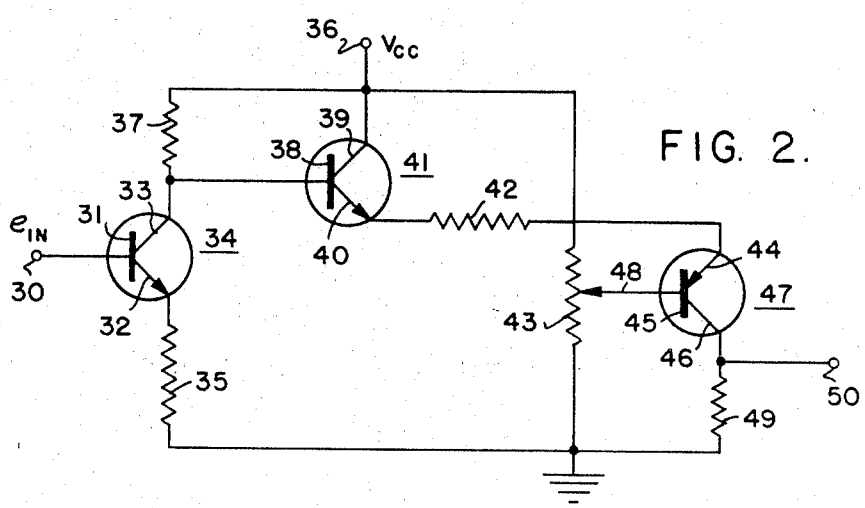
FIG. 2 is a schematic of another embodiment of the present invention.

In the embodiment of FIG. 2, an input voltage $e_{in}$ is coupled from input 30 to base element 31 of transistor 34 which also includes a collector element 33 which is connected through resistor 37 to a D.C. source 36. Transistor 34 also includes an emitter element 32 which is connected to ground through resistor 35.

Collector 33 is also connected to base element 38 of transistor 41 which has a collector element 39 connected directly to D.C. supply 36. Transistor 41 also has an emitter element 40 which is connected through a resistor 42 to emitter element 34 of a transistor 47.

Transistor 47 also has a base element 45 connected to a movable arm 48 of a potentiometer 43 which is connected between the D.C. supply 36 and ground. Transistor 47 also includes a collector element 46 which is connected to ground through resistor 49. The output voltage $e_{out}$ appears at output terminal 50 which is also connected to collector 46.

In the operation of FIG. 2, as well as that of FIG. 1, from the known input $e_{in}$, one selects the wanted output-input relationship (i.e., one-to-one, one-to-two, etc.) The D.C. supply is then chosen large enough so that transistors 14 or 34 do not saturate. The D.C. supply should be greater than twice the maximum input voltage for a one-to-one relationship. In FIG. 2 potentiometer 48 is adjusted so that the output of transistor 47 with zero input at 30 is maximum. Then, as the input increases the output will decrease in a linear fashion.

Again, the D.C. inverter of FIG. 2 functions to effect pulse amplitude conversion in accordance with the equation $e_{out} = K - e_{in}$. Thus, assuming a value of 10 for K, an input of one volt will result in an output amplitude of nine volts, and an amplitude of nine volts will cause the output amplitude to be one volt.

In FIG. 2, with $e_{in} = 0$, transistor 34 is at cutoff, the collector voltage at 33 is maximum, transistor 41 therefor on and the voltage at emitter 40 and emitter 44 are maximum. Transistor 47 is on and the output voltage developed across resistor 49 is at some maximum value as determined by the setting of the potentiometer 43. As the input voltage increases, conduction of transistor 34 increases, the voltage at collector 33 decreases thereby causing the emitter voltage of transistor 41 to drop, the emiter voltage at transistor 47 therefore also drops, and the output voltage appearing at output 50 correspondingly decreases.

Transistor 41 is included in the circuit of FIG. 2 for the purpose of providing impedance-buffering action between the transistor 34 collector output and the transistor 47 emitter input.

Figure 3:
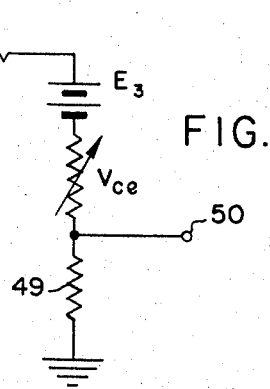
FIG. 3 is an equivalent circuit of the common base amplifier a portion of the embodiments of FIGS. 1 and 2.

The circuit of FIG. 3 illustrates the inherent temperature compensation and is the equivalent circuit of the common base amplifier transistor 47 of FIG. 2. Although the circuit will be explained with reference to FIG. 2, it is to be understood that the equivalent circuit for the common-base amplifier incorporating transistor 20 in FIG. 1 is the same.

Voltage $E_2$ appearing at the emitter of transistor 41 is coupled through resistor 42 to the emitter 44 of transistor 47. This is shown as voltage $E_3$ in FIG. 3. The voltage $E_3$ is then coupled through the variable collector-to-emitter resistance $r_{ce}$ of transistor 47 to output 50. The output 50 is connected to ground through resistor 49 as in FIG. 2.

With a constant input in FIG. 2, the voltage appearing at the collector 33 of transistor 34 decreases as the temperature increases. Thus, $E_2$ also decreases with the temperature increase. Effectively, what is happening, is that the collector-to-emitter resistance of transistor 34 decreases. This increased temperature also decreases the collector-to-emitter resistance $r_{ce}$ of transistor 47 thus causing more current to flow through resistor 49 thereby tending to keep output constant. The converse holds true for decreasing temperatures in that the collector to emitter resistances increase.

The foregoing description illustrates two embodiments of the temperature stable D.C. inverter having a minimum of components and an essentially linear output.

Obviously, many modifications and variations of the present invention are possible in the light of the above teachings. It is therefore to be understood that the invention may be practiced otherwise than as specifically described.

What is claimed is:

1. A temperature stable direct current inverting circuit comprising:
   a first transistor having emitter, collector and base electrodes;
   input means adapted to receive an input signal corresponding to $e_{in}$ coupled to the base electrode of said first transistor;
   means for grounding the emitter of said first transistor through a resistor;
   a second transistor having emitter, collector and base electrodes;
   means for coupling the collector of the first transistor with the emitter of the second transistor;
   means for simultaneously biasing the collector of the first transistor and the emitter of the second transistor;
   means for grounding the collector of the second transistor through an output resistor; so that
   the voltage appearing across said output resistor corresponds to $e_{out}$ where $e_{out} = K - e_{in}$; and
   adjustable bias means operatively connected to the base of the second transistor for setting the value of $K$.

2. The circuit of claim 1 wherein:
   the first transistor is NPN; and
   the second transistor is PNP.

3. The circuit of claim 1 wherein:
   the first transistor is PNP; and
   the second transistor is NPN.

4. The circuit of claim 1 wherein the means for coupling the collector of the first transistor with the emitter of the second transistor comprises:
   a third transistor having emitter, collector and base electrodes;
   means for directly coupling the collector of the first transistor with the base of the third transistor;
   means for biasing the collector of the third transistor; and
   means for coupling through a resistor the emiter of the third transistor with the emitter of the second transistor.

References Cited

UNITED STATES PATENTS

| | | | |
|---|---|---|---|
| 2,889,416 | 6/1959 | Shea | 330—19 X |
| 3,200,343 | 8/1965 | Skinner | 330—17 |

FOREIGN PATENTS

| | | |
|---|---|---|
| 1,229,922 | 3/1960 | France. |

ROY LAKE, Primary Examiner

SIEGFRIED H. GRIMM, Assistant Examiner

U.S. Cl. X.R.

330—18, 19, 20